United States Patent
Okada et al.

(10) Patent No.: US 12,548,137 B2
(45) Date of Patent: Feb. 10, 2026

(54) MANAGEMENT DEVICE, MANAGEMENT METHOD, AND CORRESPONDENCE DATA GENERATING METHOD

(71) Applicant: FUJIKURA LTD., Tokyo (JP)

(72) Inventors: Naoki Okada, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 367 days.

(21) Appl. No.: 18/020,355

(22) PCT Filed: Jul. 7, 2021

(86) PCT No.: PCT/JP2021/025676
§ 371 (c)(1),
(2) Date: Feb. 8, 2023

(87) PCT Pub. No.: WO2022/054385
PCT Pub. Date: Mar. 17, 2022

(65) Prior Publication Data
US 2023/0289946 A1    Sep. 14, 2023

(30) Foreign Application Priority Data
Sep. 8, 2020   (JP) .................................. 2020-150260

(51) Int. Cl.
*G06T 7/00* (2017.01)
*B65H 63/08* (2006.01)

(52) U.S. Cl.
CPC ........... *G06T 7/0004* (2013.01); *B65H 63/08* (2013.01); *B65H 2553/42* (2013.01)

(58) Field of Classification Search
CPC ......... G06T 7/0004; G06T 2207/20081; G06T 2207/20084; G06T 2207/30136;
(Continued)

(56) References Cited

U.S. PATENT DOCUMENTS

2017/0369262 A1   12/2017   Green
2018/0141787 A1   5/2018   Rudy et al.

FOREIGN PATENT DOCUMENTS

CA    2309399 A1    12/2000
EP    3 323 765 A1   5/2018
(Continued)

OTHER PUBLICATIONS

International Search Report issued in corresponding International Application No. PCT/JP2021/025676, dated Aug. 17, 2021 (3 pages).

*Primary Examiner* — Sheela C Chawan
(74) *Attorney, Agent, or Firm* — Osha Bergman Watanabe & Burton LLP

(57) ABSTRACT

A management device that manages a unit including a drum and a long object wound around the drum, the management device includes: a receiver that receives, from a user terminal, a captured image obtained by capturing an image of the unit; and a controller that accesses correspondence data obtained by associating each of image capture results, obtained by successively capturing images of the unit while winding the long object around the drum, with a corresponding winding amount of the long object wound around the drum at a time when the each of the image capture results was obtained. The controller determines a remaining amount of the long object based on the captured image and the correspondence data.

10 Claims, 14 Drawing Sheets

(58) Field of Classification Search
CPC ...... G06T 7/62; B65H 63/08; B65H 2553/42; B65H 63/00; B65H 55/00; B65H 2511/11; Y02P 90/30
USPC .................................. 382/100, 141
See application file for complete search history.

(56) References Cited

FOREIGN PATENT DOCUMENTS

| | | | |
|---|---|---|---|
| JP | H01318990 | A | 12/1989 |
| JP | H02196913 | A | 8/1990 |
| JP | H03-008604 | A | 1/1991 |
| JP | H04037167 | U | 3/1992 |
| JP | 2000053326 | A | 2/2000 |
| JP | 2003118939 | A | 4/2003 |
| JP | 4536849 | B2 | 9/2010 |
| JP | 5355662 | B2 | 11/2013 |
| JP | 2015024888 | A | 2/2015 |
| JP | 6113600 | B2 | 4/2017 |
| JP | 2017074975 | A | 4/2017 |
| JP | 2017226485 | A * | 12/2017 |
| JP | 2018024529 | A | 2/2018 |
| JP | 6385267 | B2 | 9/2018 |
| JP | 2018177530 | A | 11/2018 |
| JP | 2019218201 | A | 12/2019 |
| JP | 2020-125162 | A | 8/2020 |
| WO | 2019-107007 | A1 | 6/2019 |

\* cited by examiner

| UNIT ID | DRUM ID | CABLE ID | ENTIRE LENGTH | MANUFACTURING DATE |
|---|---|---|---|---|
| No.001 | DRUM No.34 | CABLE No.005 | 1000m | JULY 20, 2020 |

FIG. 5

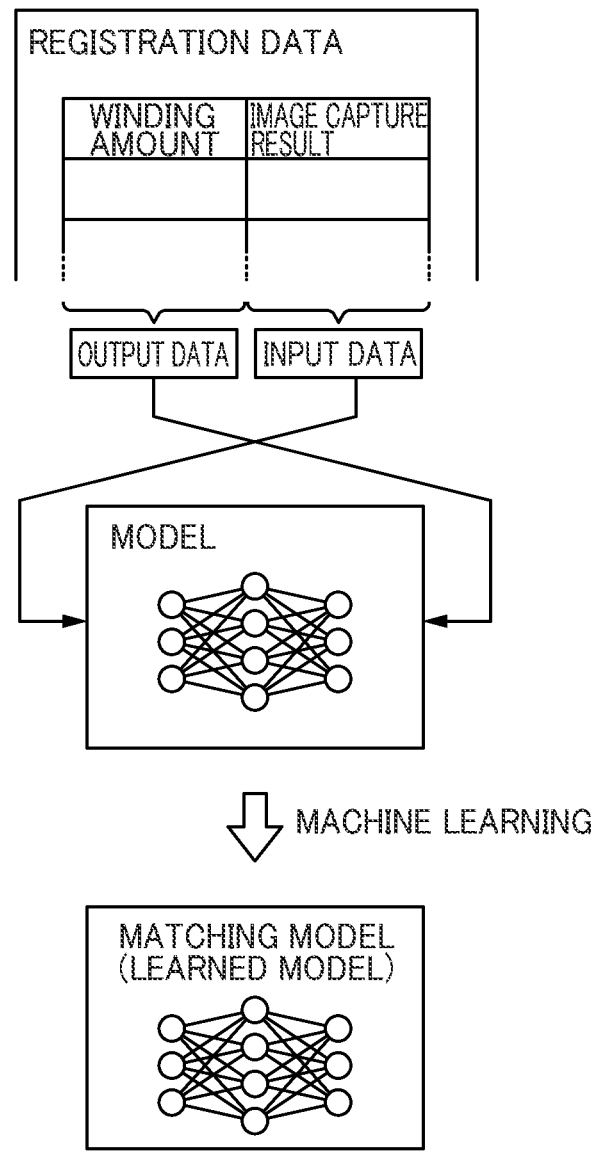
FIG. 14A (LEARNING PHASE)
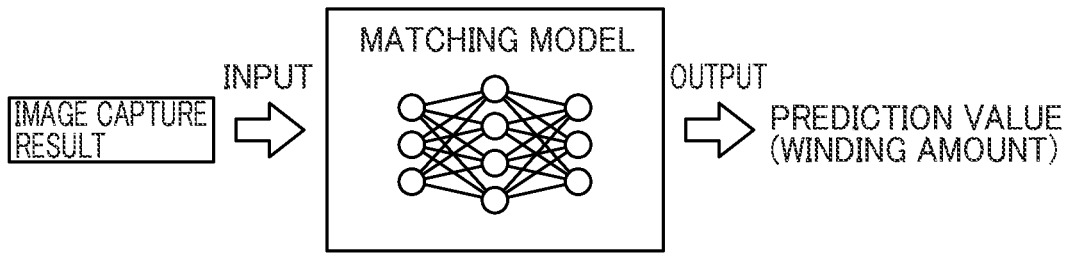
FIG. 14B (PREDICTION PHASE)

MANAGEMENT DEVICE, MANAGEMENT METHOD, AND CORRESPONDENCE DATA GENERATING METHOD

BACKGROUND

Technical Field

The present invention relates to management devices, management methods, and methods for generating matching (correspondence) data.

Description of the Related Art

An example of a technique for managing the remaining amount of a long object (e.g., a cable or wire) includes the technique disclosed in Patent Literature 1. Patent Literature 1 describes attaching a management module to a drum onto which a long object is wound.

PATENT LITERATURE

Patent Literature 1: JP No. 2019-218201

The management method disclosed in Patent Literature 1 requires the attachment of a management module to the drum. This involves the cost of the management module.

SUMMARY

One or more embodiments may facilitate the management of long objects.

One or more embodiments relate to a management device configured to manage a unit in which a long object is wound around a drum, the management device configured to determine a remaining amount of the long object based on a matching result found by matching: matching data (correspondence data) obtained by associating an image capture result (each of image capture results) obtained by successively capturing images of the unit while winding the long object around the drum, and a winding amount (a corresponding winding amount) of the long object wound around the drum at the time of image capturing (at a time when each of the image capture results was obtained); and an image capture result (a captured image) of the unit acquired (received by a receiver) from a user terminal.

Other features of one or more embodiments will be disclosed in the present Description with reference to the drawings.

According to one or more embodiments, it is possible to facilitate the management of long objects.

BRIEF DESCRIPTION OF THE DRAWINGS

FIG. 5 is an explanatory diagram of an example of basic unit data.

FIG. 14A is an explanatory diagram of one or more embodiments.

FIG. 14B is an explanatory diagram of one or more embodiments.

DESCRIPTION OF THE EMBODIMENTS

Figure 1:
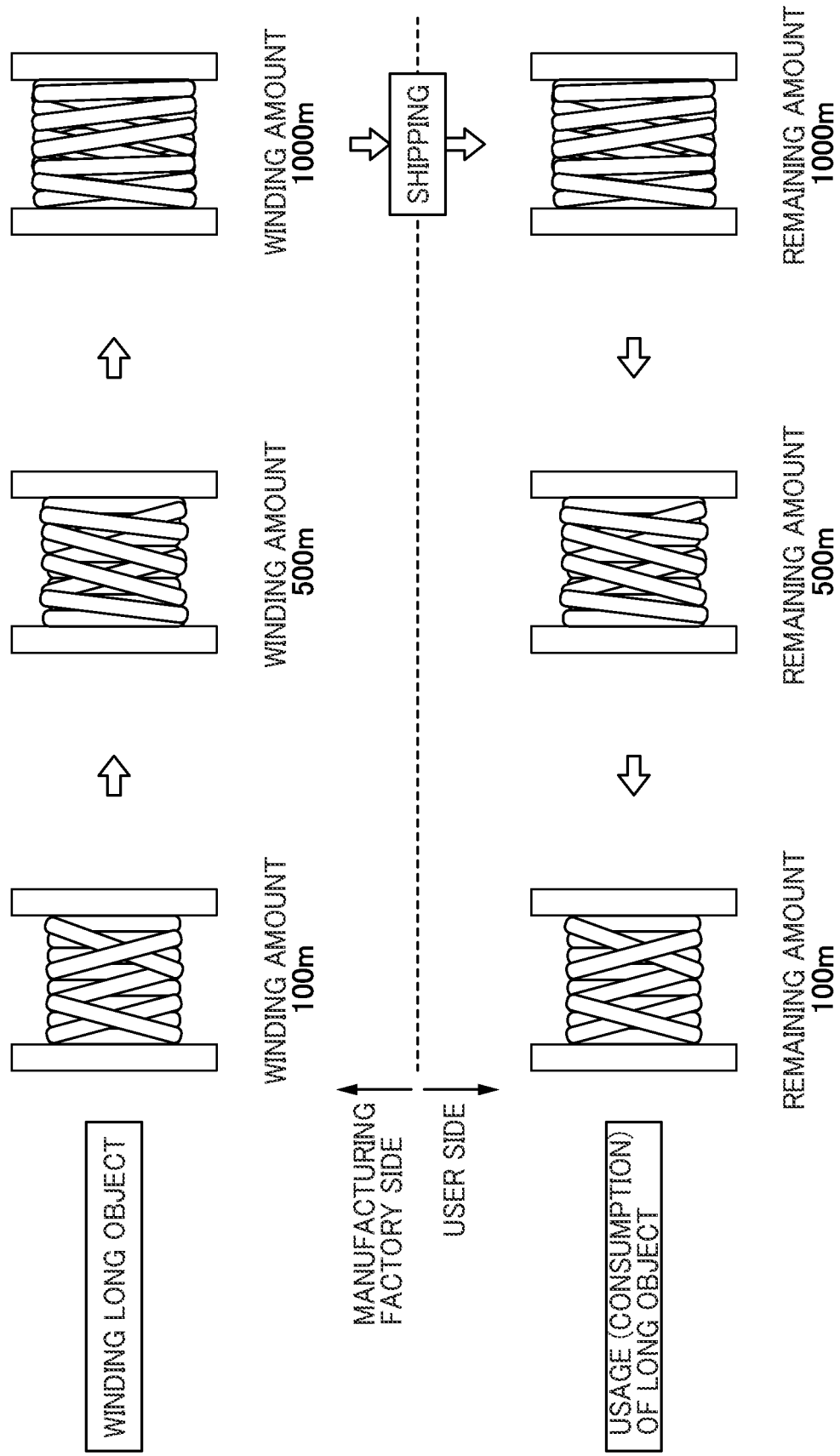
FIG. 1 is an explanatory diagram illustrating relationships between patterns of a unit and winding amounts (remaining amounts) of a long object.

At least the following features are disclosed in the Description and Drawings as described below.

Disclosed is a management device configured to manage a unit in which a long object is wound around a drum, the management device configured to determine a remaining amount of the long object based on a matching result found by matching: matching data obtained by associating an image capture result obtained by successively capturing images of the unit while winding the long object around the drum, and a winding amount of the long object wound around the drum at the time of image capturing; and an image capture result of the unit acquired from a user terminal. With this management device, management of a long object can be facilitated.

Preferably, in the matching data, a unit ID for identification of the unit, the winding amount of the long object, and the image capture result are associated with one another, and preferably, the unit ID is determined based on a matching result found by matching the matching data and the image capture result acquired from the user terminal. In this way, unit management can be facilitated.

Preferably, the unit ID is associated with information regarding the unit, and preferably, after determining the unit ID by matching the matching data and the image capture result acquired from the user terminal, the information regarding the unit associated with the unit ID is transmitted to the user terminal. In this way, unit management can be facilitated.

Preferably, a mark is formed on the long object. In this way, matching accuracy can be enhanced.

Preferably, in the matching data, the winding amount of the long object and a feature value extracted from image data obtained by capturing an image of the unit are associated with one another. In this way, matching accuracy can be enhanced.

Preferably, the remaining amount of the long object determined based on the matching result is stored. In this way, management of the remaining amount of the long object can be facilitated.

Preferably, when an image capture result of the unit is acquired again from the user terminal, the image capture result re-acquired from the user terminal is matched with the matching data by excluding the winding amount greater than the remaining amount from target of matching. In this way, the time required for match processing can be reduced.

Preferably, the matching data is a learned model generated by machine learning, wherein the image capture result serves as input data and the winding amount serves as output data. In this way, matching accuracy can be enhanced.

Also disclosed is a management method for managing a unit in which a long object is wound around a drum, the management method involving: acquiring an image capture result of the unit from a user terminal; and determining a remaining amount of the long object based on a matching result found by matching: matching data obtained by associating an image capture result obtained by successively capturing images of the unit while winding the long object around the drum, and a winding amount of the long object wound around the drum at the time of image capturing; and the image capture result acquired from the user terminal. With this management method, management of a long object can be facilitated.

Also disclosed is a matching data generating method involving: acquiring a plurality of pieces of registration data by successively capturing images of a unit while winding a long object around a drum, the registration data including an image capture result and a winding amount of the long object wound around the drum at the time of image capturing; and generating matching data by employing the plurality of pieces of registration data, wherein the image capture result of the unit serves as input and the winding amount serves as output. With this matching data generating method, it is possible to generate matching data with which the remaining amount of a long object can be managed easily.

PRESENT EMBODIMENTS

In the description below, "long object" refers to a member having a long length. Examples of long objects may include linear members such as cables (electric wire cables, optical cables, etc.), threads, wires, etc., and band-shaped members such as tapes/ribbons, films, etc.

In the description below, "drum" refers to a member onto which a long object is wound. A drum has a circular cylindrical body part, and a long object is wound around the outer periphery of the body part. Flange parts may be formed respectively at both ends of the body part of the drum. An example of a drum may include a member referred to as a bobbin.

In the description below, "unit" refers to an assembly in which a long object is wound around a drum. Examples of units may include assemblies in which a cable is wound around a drum, assemblies in which a thread is wound around a bobbin, and so forth.

FIG. 1 is an explanatory diagram illustrating relationships between patterns of a unit and winding amounts (remaining amounts) of a long object.

Three units are illustrated in the upper part of FIG. 1. The lengths (winding amounts) of the long object wound around the drum are 100 m, 500 m, and 1000 m, respectively, in order from the left-hand side of the figure. As illustrated in the figure, the long object wound around the drum creates various patterns on the surface of a unit. The patterns of the unit vary depending on the respective winding amounts; hence, each pattern is unique, like a fingerprint.

At a unit manufacturing factory, a unit is manufactured by winding a long object around a drum multiple times in layers. At the unit manufacturing factory, the unit may be manufactured from scratch, or a unit may be manufactured by re-wrapping a long object on an already-manufactured unit onto another drum. While the long object is being wound around the drum, the patterns on the unit change consecutively due to the long object being wound onto the drum and the consecutively changing patterns. A pattern at a certain winding amount during manufacturing will be hidden under the long object which is further wound thereon. For example, as illustrated in the upper part of FIG. 1, the pattern at a winding amount of 100 m will not be exposed in a state where the winding amount is 500 m or 1000 m. Likewise, the pattern at a winding amount of 500 m will not be exposed in a state where the winding amount is 1000 m. Note, however, that each pattern corresponding to the respective winding amount is preserved under the long object wound thereon.

The lower part of FIG. 1 illustrates how the long object is drawn out from the drum and thereby the remaining amount (which corresponds to the winding amount) of the long object wound around the drum decreases. In this example, the remaining amounts of the long object wound around the drum are 1000 m, 500 m, and 100 m, respectively, in order from the right-hand side of the figure. As the long object is drawn out from the drum, the various patterns hidden under the drawn-out long object appear. The pattern that has appeared is a unique pattern indicating the remaining amount (which corresponds to the winding amount) of the long object wound around the drum at that point in time.

In one or more embodiments, the remaining amount of the long object is managed by employing this characteristic of the unit's patterns. More specifically, by successively capturing images of the unit while winding the long object around the drum at the time of manufacturing the unit, matching data—in which image capture results are associated with winding amounts respectively indicating the amount of long object wound at the time of image capturing—is generated. In this way, the unit's patterns are registered. On the other hand, a user using the unit will capture an image of the unit after using the unit, and will transmit the image capture result. Then, the image capture result acquired from the user is matched with the matching data, and thereby, the remaining amount of the long object is determined based on the matching result. Stated differently, by matching the pattern of the user's unit and the patterns of the unit registered during manufacturing, the remaining amount (winding amount) of the long object of the user's unit is determined. This management method according to one or more embodiments can facilitate management of the remaining amount of the long object.

It should be noted that, even in cases where a plurality of units is manufactured in a uniform manner, the units' patterns will vary unit by unit. Thus, if the unit is different, the unit's pattern will also be different even if the winding amount is the same. Hence, the pattern of each unit is unique, like a fingerprint. By employing this characteristic of the units' patterns, it is not only possible to manage the remaining amount of the long object, but it is also possible to manage the types of units (unit IDs).

First Example

Figure 2:
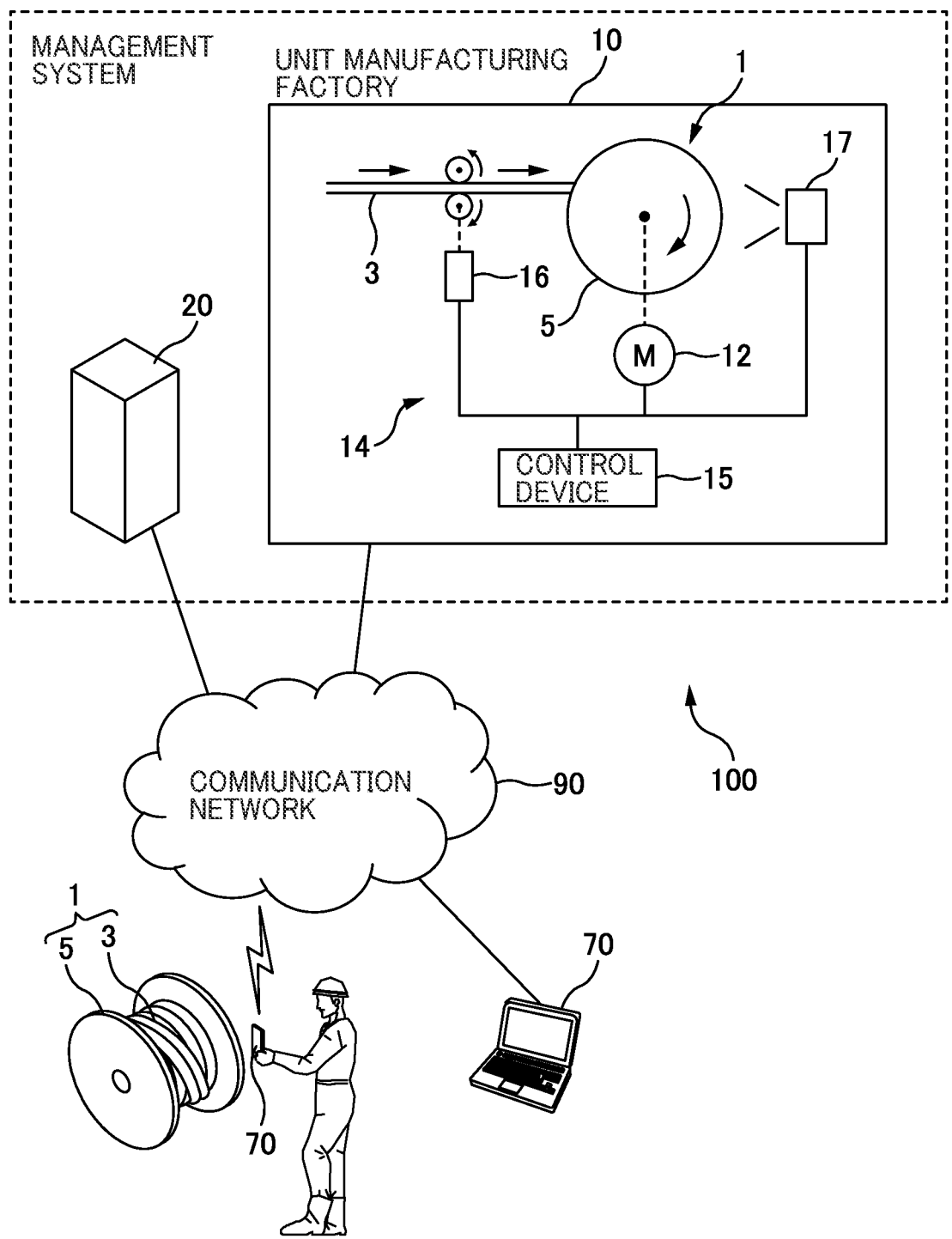
FIG. 2 is an explanatory diagram of an example of a management system according to one or more embodiments.
Figure 3:
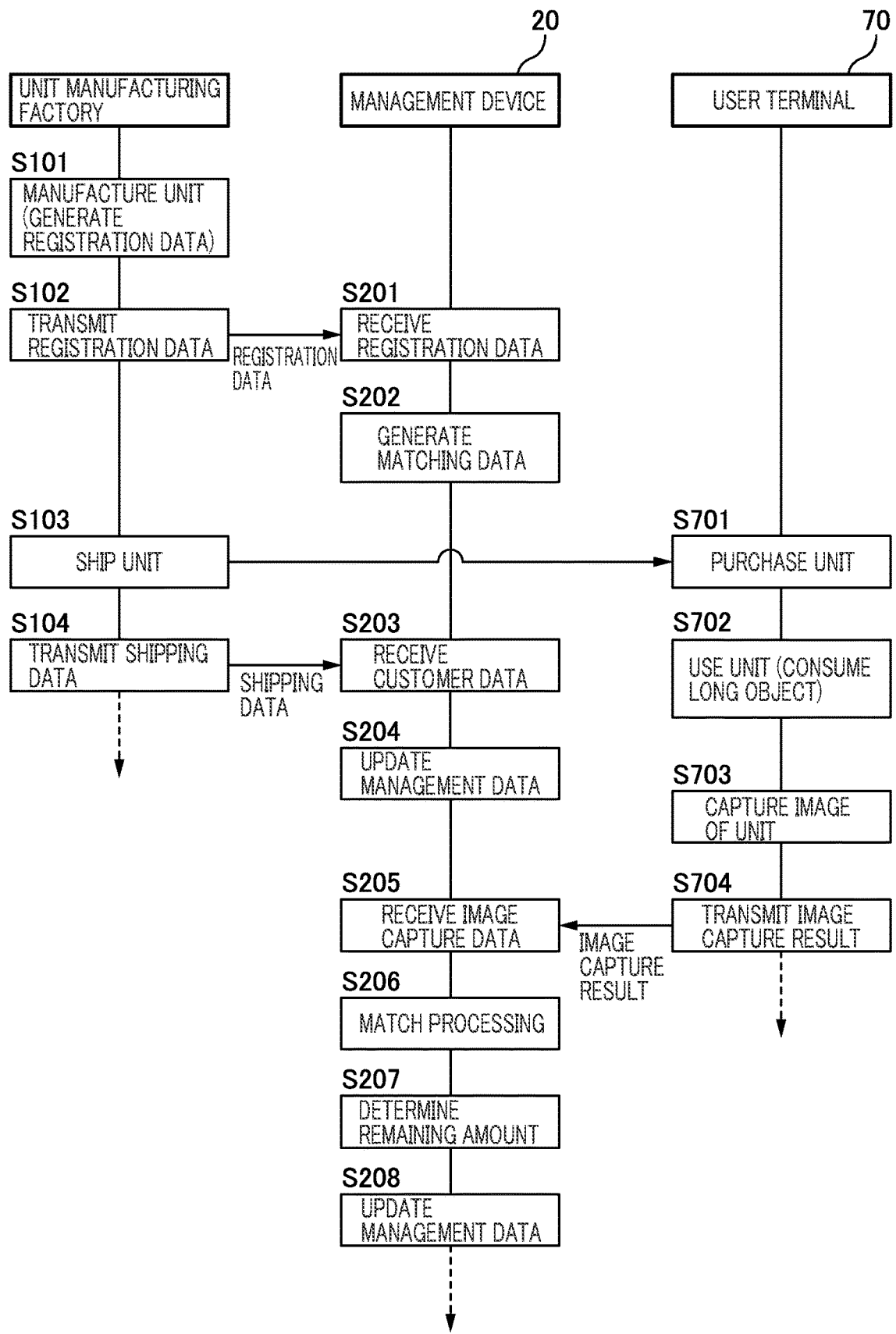
FIG. 3 is an explanatory diagram of an example of a flow of processes according to one or more embodiments.

FIG. 2 is an explanatory diagram of an example of a management system 100 according to one or more embodiments. FIG. 3 is an explanatory diagram of an example of a flow of processes according to one or more embodiments.

A management system 100 is a system for managing the remaining amount of a long object 3 of a unit 1 in the possession of a user. The management system 100 includes a unit manufacturing device 10 provided in a unit manufacturing factory, and a management device 20. The management system 100 is communicable with a user terminal 70 via a communication network 90. The communication network 90 may be, for example, a telephone network (public phone network, mobile phone network, etc.), a radio communication network, the Internet, a LAN, a WAN, etc. Herein, the Internet serves as the communication network. The user terminal 70 may be, for example, a smartphone or a mobile phone having an image capturing device (camera). It should be noted that the user terminal 70 does not have to directly include an image capturing device (camera), but instead may be a terminal (e.g., mobile computer) capable of acquiring an image capture result from an external image capturing device. The user terminal 70 is communicable with the management device 20 via the communication network 90, and, for example, is capable of transmitting, to the management device 20, an image capture result captured with an image capturing device (camera).

It should be noted that "image capture result" refers to information obtained by capturing an image with an image capturing device. The "image capture result" may include, for example, image data (raw data) outputted from an image capturing device, image data (processed image data) obtained by processing image data (raw data) outputted from an image capturing device, data (e.g., vector data such as feature values) acquired from image data, etc. An "image capture result obtained at the time of manufacturing a unit 1" may be referred to as "registered image capture result", whereas an "image capture result of a unit 1 acquired from a user terminal 70" may be referred to as "user image capture result". Further, one of the image capture result obtained at the time of manufacturing a unit 1 and the image capture result of a unit 1 acquired from a user terminal 70 may be referred to as "first image capture result", and the other image capture result may be referred to as "second image capture result".

The unit manufacturing device 10 is a device for manufacturing a unit 1 by winding a long object 3 around a drum 5. For example, the unit manufacturing device 10 includes a supply source (not illustrated) for supplying the long object 3 to the drum 5, and a winding device 12 for winding the long object 3 around the drum 5. The supply source (not illustrated) may be, for example, a long object manufacturing device for manufacturing the long object 3. The winding device 12 may be, for example, a motor for rotating the drum 5.

The unit manufacturing device 10 of one or more embodiments includes a registration data generating device 14. The registration data generating device 14 is a device for successively capturing images of the unit 1 while winding the long object 3 around the drum 5 at the time of manufacturing the unit 1, and generating data (registration data) in which the image capture result is associated with a winding amount indicating the amount of the long object 3 wound at the time of image capturing. In the registration data, the image capture result is associated with the winding amount of the long object wound around the drum at the time the image of that image capture result was captured. The registration data is generated at the time of manufacturing the unit 1 (see S101 of FIG. 3). The registration data generating device 14 includes a length measuring device 16, an image capturing device 17, and a control device 15.

The length measuring device 16 is a device for measuring the length of the long object 3 wound around the drum 5. For example, the length measuring device 16 measures the amount (feed amount) of the long object 3 fed to the drum 5, and thereby measures the length (winding amount) of the long object 3 wound around the drum 5. Note, however, that the length measuring device 16 may measure the winding amount according to other methods. For example, the length measuring device 16 may be constituted by a rotary encoder for measuring the amount of rotation of the drum 5, and the winding amount may be measured based on the amount of rotation of the drum 5. The length measuring device 16 outputs the measurement result (information regarding the winding amount) to the control device 15.

The image capturing device 17 is a device for capturing images of the unit 1 while the long object 3 is being wound around the drum 5. For example, the image capturing device 17 is constituted by a camera, such as a digital still camera for capturing still images, or a digital video camera for capturing a moving image. The image capturing device 17 may be constituted by a single camera, or may be constituted by a plurality of cameras. In cases where the image capturing device 17 is constituted by a plurality of cameras, it is preferable that the cameras are arranged along the outer periphery of the drum 5 (or the outer periphery of the cable wound around the drum 5). The image capturing device 17 may include a light emission device such as a strobe light device. The image capturing device 17 outputs image data, as an image capture result, to the control device 15. In cases of capturing still images, the image capturing device 17 captures images successively while the long object 3 is being wound around the drum 5, and outputs image data of a multitude of successive still images to the control device 15. In cases of capturing a moving image, the image capturing device 17 captures a moving image to acquire a plurality of still images (frames) while the long object 3 is being wound around the drum 5, and outputs image data of the moving image, including the plurality of still images (frames), to the control device 15. In cases where the image capturing device 17 captures a moving image, image capturing may be performed continuously from the start to end of winding the long object 3, or the moving image may be captured intermittently.

The control device 15 is a control module (controller) for governing control of the registration data generating device 14. For example, the control device 15 is constituted by a personal computer. The control device 15 may control the unit manufacturing device 10 (e.g., the winding device). The control device 15 acquires the measurement result (i.e., information regarding the length of the long object 3 wound around the drum 5) from the length measuring device 16. Also, the control device 15 acquires image data, as an image capture result, from the image capturing device 17. Based on the measurement result from the length measuring device 16 and the image capture result from the image capturing device 17, the control device 15 generates registration data in which the winding amount of the long object 3 at the time of image capturing is associated with the image capture result.

In one or more embodiments, the control device 15 generates registration data in which the winding amount of the long object 3 at the time of image capturing is associated with image data of a still image (i.e., an image capture result). Note, however, that the image capture result to be included in the registration data is not limited to image data of a still image. For example, by providing the control device 15 with some functionality of the later-described management device 20 (e.g., the functionality of an image processor 32), the control device may obtain, as an image capture result, feature value information (described below) acquired from the image data, and generate registration data in which the winding amount of the long object 3 at the time of image capturing is associated with the feature value information.

Figure 4A:
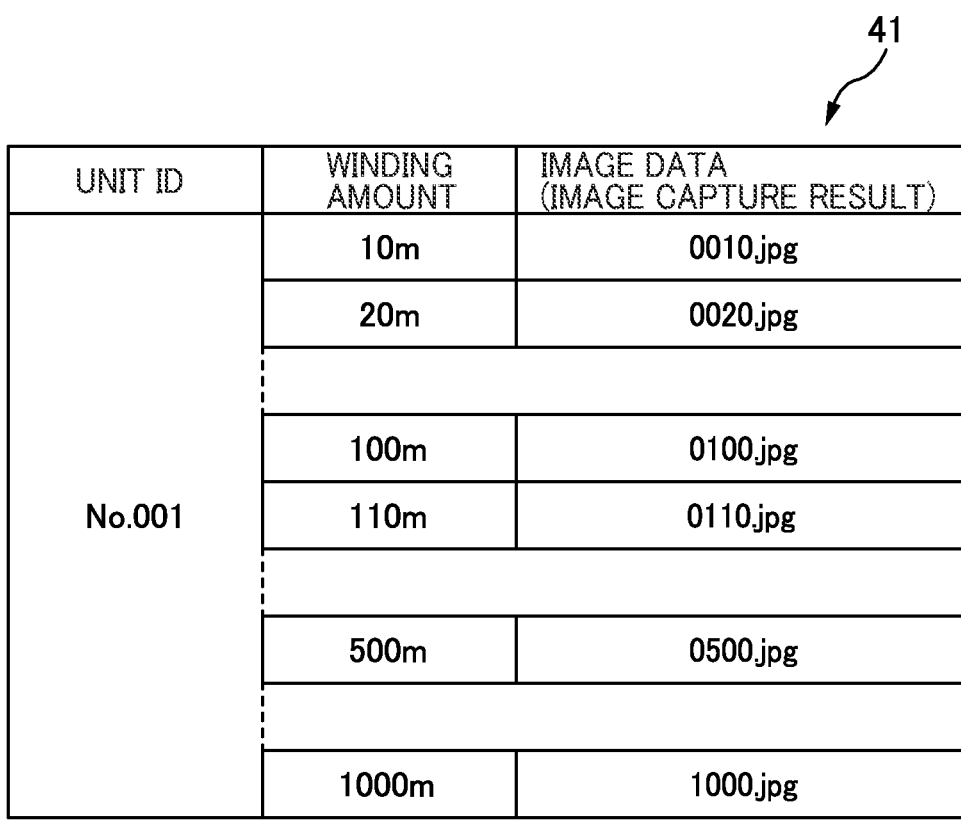
FIG. 4A is an explanatory diagram of an example of registration data.

FIG. 4A is an explanatory diagram of an example of registration data. The registration data 41 illustrated in the figure is data in which the winding amount of the long object 3 at the time of image capturing is associated with image data which is the image capture result. In the registration data 41 in this example, a piece of image data (e.g., JPG data) is associated for every 10 m in winding amount. For example, every time the length measuring device 16 detects that 10 m of the long object 3 has been fed to the drum 5, the control device 15 causes the image capturing device 17 to capture one still image, and thereby, the illustrated registration data can be generated. It is preferable that a unit ID for identification of the unit 1 is assigned in the registration data 41.

Figure 4B:
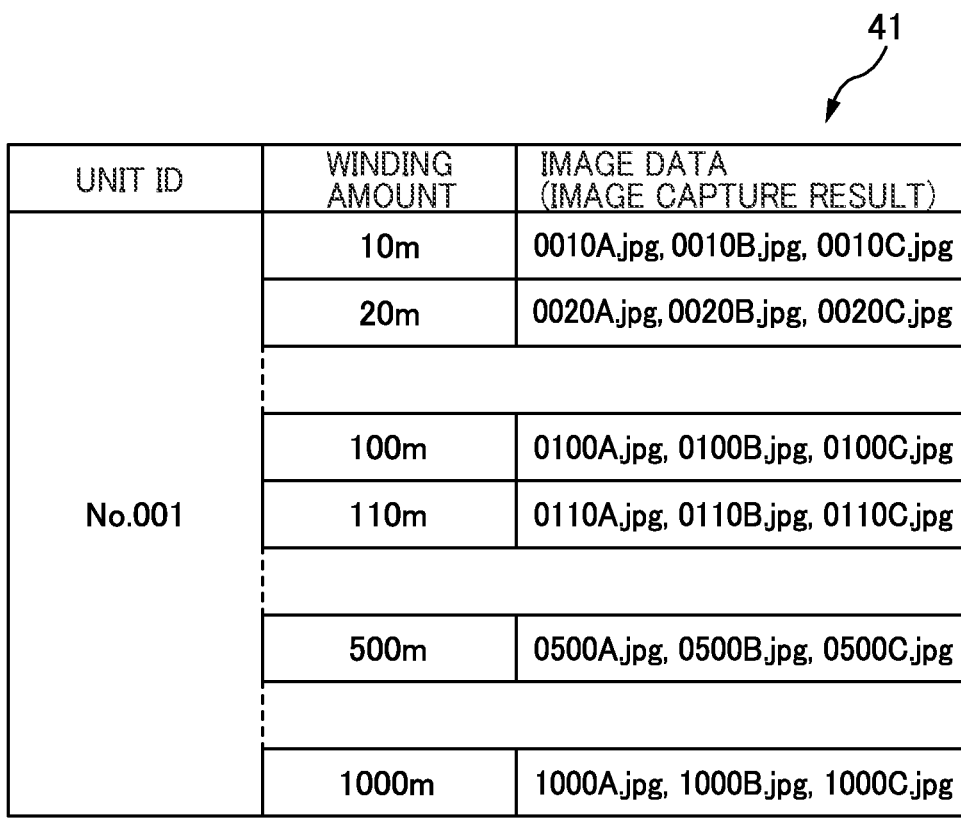
FIG. 4B is an explanatory diagram of another example of registration data.

FIG. 4B is an explanatory diagram of another example of registration data. In this registration data 41, three pieces of image data are associated to every winding amount. As illustrated herein, a plurality of pieces of image data may be associated to the winding amount.

For example, a plurality of cameras may be arranged along the outer periphery of the drum 5. Every time the length measuring device 16 detects that 10 m of the long object 3 has been fed to the drum 5, the control device 15 causes the respective cameras of the image capturing device 17 to capture one image each. In this way, the illustrated registration data 41 can be generated.

Alternatively, in cases where there is only one camera, then, every time the length measuring device 16 detects that 10 m of the long object 3 has been fed to the drum 5, the control device 15 causes the camera to capture images a plurality of times while the drum 5 rotates once (causes the camera to capture an image every time the drum 5 rotates 120 degrees). In this way, the illustrated registration data can be generated.

In this way, images covering the entire periphery of the long object 3 (or a wide range thereof) wound around the drum 5 can be registered for a given winding amount.

It should be noted that, after manufacturing the unit 1, the control device 15 assigns a unit ID to that unit 1, and generates basic unit data as data regarding that unit 1.

FIG. 5 is an explanatory diagram of an example of basic unit data. The basic unit data is data in which information (basic unit information) at the time of manufacturing the unit 1 is associated with the unit ID. The basic unit information may include, for example, a drum ID for identification of the type of drum 5, an ID (a cable ID in this example) for identification of the type of long object 3, the entire length of the long object 3 wound around the unit 1, the manufacturing date of the unit 1, etc. Note, however, that the information at the time of manufacture associated with the unit ID is not limited thereto.

The registration data generating device 14 of the unit manufacturing device 10 transmits the generated registration data 41 (and the basic unit data) to the management device 20 (see S002 of FIG. 3). In this way, the registration data 41 is registered to the management device 20 (the pattern of the unit 1 at the time of manufacture is registered). Every time the unit manufacturing device 10 manufactures a unit 1, the registration data generating device 14 generates registration data 41 corresponding to that unit 1 and transmits the data to the management device 20.

The management device 20 is a device for managing the unit(s) 1 (see FIG. 2). In one or more embodiments, the management device 20 manages the remaining amount of the long object 3 of the unit 1. For example, the management device 20 is constituted by a computer, such as a personal computer, a server, etc.

Figure 6:
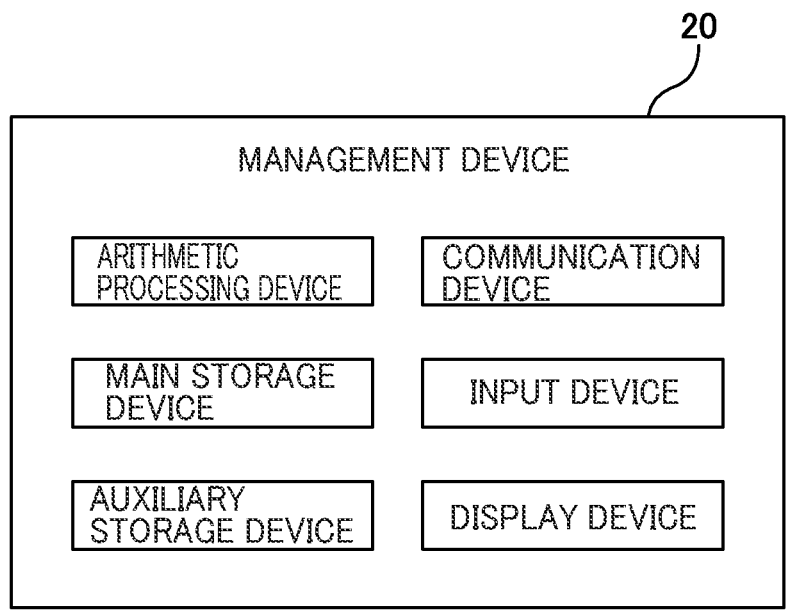
FIG. 6 is an explanatory diagram illustrating a hardware configuration of a management device according to one or more embodiments.

FIG. 6 is an explanatory diagram illustrating a hardware configuration of the management device 20.

The management device 20 includes an arithmetic processing device, a storage device, and a communication device. The various elements illustrated in the figure are connected via a bus (not illustrated). The arithmetic processing device is a device for governing control of the management device 20. The arithmetic processing device is constituted, for example, by a CPU, a GPU, an AI chip, etc. The storage device is constituted, for example, by a main storage device such as a RAM, etc., and an auxiliary storage device such as a hard disk drive, an SSD, etc. The arithmetic processing device reads out and executes a program stored in the storage device, and thereby, various processes described below are executed. It should be noted that the storage device may encompass a non-transitory storage medium for storing a program for causing the management device 20 to execute the various processes described below. The communication device is a device for connecting with the communication network 90, and is constituted, for example, by a communication module etc. The management device 20 may include a display device (e.g., a display) and/or an input device (e.g., a keyboard, a mouse, etc.). The management device 20 may be constituted by a single computer, or may be constituted by a plurality of computers. In cases where the management device 20 is constituted by a plurality of computers, for example, the various functions described below (e.g., image processing, match processing, etc.) may be distributed and implemented on separate computers for each process, or the same function may be distributed among a plurality of computers.

Figure 7:
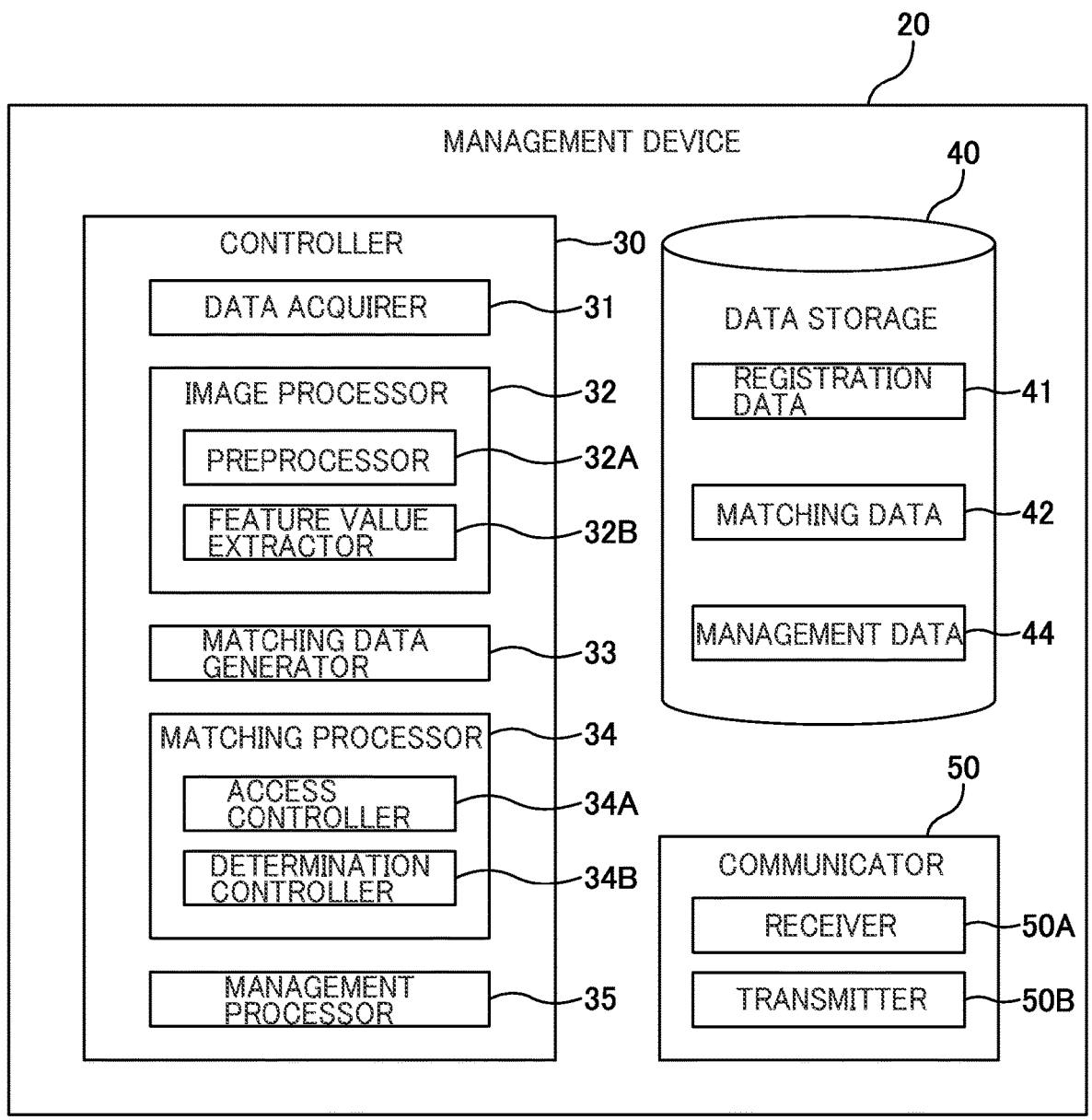
FIG. 7 is a block diagram illustrating functions of the management device according to one or more embodiments.

FIG. 7 is a block diagram illustrating functions of the management device 20.

A controller 30 performs various processes to be performed by the management device 20. The controller 30 is implemented by the arithmetic processing device performing various controls by executing a control program stored in the storage device. The controller 30 includes a data acquirer 31, an image processor 32, a matching data generator 33, a matching processor 34, and a management processor 35. In cases where a device separate from the management device 20 is to generate matching data (see S202 of FIG. 3), the management device 20 does not have to include the image processor 32 and/or the matching data generator 33. The various functions of the controller 30 will be described further below.

A data storage 40 is a storage for storing predetermined data. The data storage 40 is mainly implemented by a portion of a storage region of the storage device. In this example, the data storage 40 includes matching data 42 and management data 44. In cases where a device separate from the management device is to generate matching data (see S202 of FIG. 3), the registration data 41 and/or the matching data 42 may be stored in a data storage of the device separate from the management device 20. The various data stored by the data storage 40 will be described further below.

A communicator 50 performs data communication. The communicator 50 is implemented by the arithmetic processing device controlling the communication device (see FIG. 6). The communicator 50 includes a receiver 50A and a transmitter 50B. The receiver 50A receives, for example, data from the unit manufacturing device 10 (the registration data generating device 14), the user terminal 70, etc. The transmitter 50B transmits, for example, data to the user terminal 70, etc.

The management device 20 receives the registration data 41 from the unit manufacturing device 10 (the registration data generating device 14) (see S201 of FIG. 3). In this way, the management device 20 acquires a plurality of pieces of data including the winding amount of the long object 3 obtained by successively capturing images of the unit 1 while winding the long object 3 around the drum 5 and the image capture result corresponding to the winding amount. The data acquirer 31 of the management device 20 stores the received registration data in the data storage 40. It should be noted that the data acquirer 31 also stores the basic unit data (see FIG. 5) received from the unit manufacturing device 10 in the data storage 40.

Next, the matching data generator 33 of the management device 20 generates matching data 42 based on the registration data 41 (see S202 of FIG. 3). In one or more embodiments, the image processor 32 of the management device 20 first subjects the image data in the registration data 41 to image processing, and then the matching data generator 33 generates the matching data 42. The matching data 42 is data for performing match processing (later-described S206) for matching the image capture result at the time of manufacturing the unit and an image capture result from a user, and is also referred to as a matching database or a matching model. The matching data 42 is data in which winding amounts of the long object 3 and image capture results, which are obtained by successively capturing images of the unit 1 while winding the long object 3 around the drum 5 at the time of manufacturing the unit 1, are associated with one another. The matching data is data wherein the image capture result of the unit 1 serves as input and the winding amount of the long object 3 serves as output.

The image processor 32 performs image processing on the image data. In one or more embodiments, the image processor 32 includes a preprocessor 32A and a feature value extractor 32B, and performs feature value extraction processing after subjecting the image data to preprocessing.

The preprocessor 32A performs preprocessing on the image data. Examples of preprocessing performed by the preprocessor 32A on the image data may include distortion correction processing, region extraction processing, coordinate transformation processing, merge processing, edge extraction processing, etc.

For example, the preprocessor 32A performs processing (distortion correction processing) for correcting distortions in an image expressed by the image data. As for the distortion correction processing, the preprocessor 32A may apply a lens correction filter to the image data, or may subject the image data to projective transformation processing.

Also, for example, the preprocessor 32A performs processing (region extraction processing) for extracting a region of an image of the unit 1 from the image expressed by the image data. By performing region extraction processing before feature value extraction processing, it is possible to suppress feature values from being extracted from regions in the image data outside the unit 1.

Figure 8:
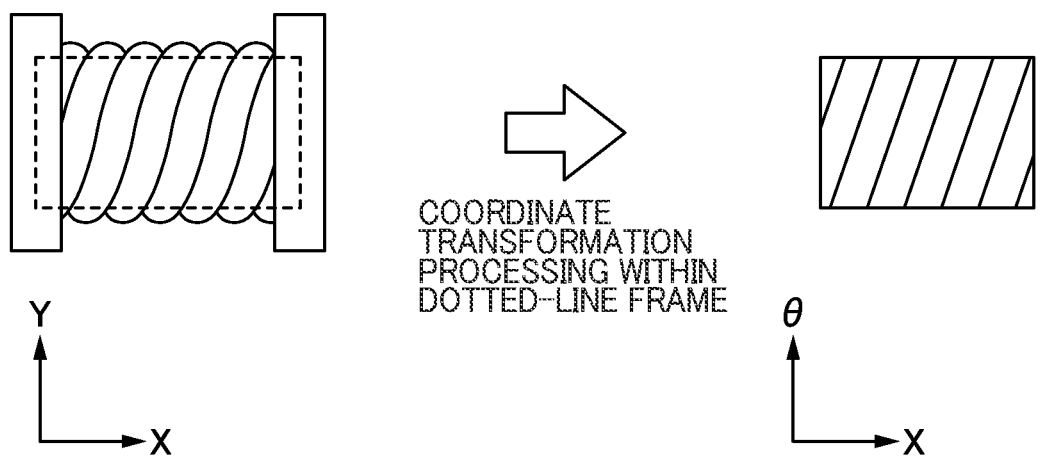
FIG. 8 is an explanatory diagram of coordinate transformation processing according to one or more embodiments.

Also, for example, the preprocessor 32A performs processing (coordinate transformation processing) for transforming the coordinates of the image data. FIG. 8 is an explanatory diagram of coordinate transformation processing according to one or more embodiments. The left-side diagram in the figure illustrates an image before coordinate transformation processing. In one or more embodiments, images of the long object 3 are captured in a state wound in a cylindrical form; hence, in the upper and lower edge regions within the dotted-line frame in the figure, the long object 3 is captured obliquely compared to the central region. The right-side diagram in the figure illustrates an image obtained by subjecting the image within the dotted-line frame to coordinate transformation processing. By finding the θ coordinate on the cylindrical coordinate system from the Y coordinate of the X-Y coordinates of each pixel in the image data, the image can be transformed into a pseudo-image which simulates the cylindrically-wound long object 3 being captured along the circumferential direction. Through this coordinate transformation processing, the locations of feature points (described below) can be corrected, thus enabling highly accurate matching.

Also, for example, the preprocessor 32A performs processing (merge processing) for merging images of a plurality of pieces of image data. As illustrated in FIG. 4B, in cases where a plurality of pieces of image data are assigned to each winding amount, it is possible to subject the plurality of pieces of image data to merge processing (mosaicking) to merge them into a single image by employing the overlapping portions in the images. In this way, it is possible to generate image data which renders an image of the entire periphery (or a wide range thereof) of the long object 3 wound around the drum 5.

Also, for example, the preprocessor 32A performs processing (edge extraction processing) for extracting edges (outlines) in an image of the image data. By performing edge extraction processing before the feature value extraction processing, it is possible to increase the number of significant feature points (described below).

It should be noted that the preprocesses performed by the preprocessor 32A are not limited to the above. For example, other processing, such as color correction processing, luminance correction processing, etc., may be performed.

The feature value extractor 32B performs processing (feature value extraction processing) for extracting feature values from the image data. For example, the feature value extractor 32B employs SIFT (Scale-Invariance Feature Transform) to extract feature values. In one or more embodiments, intersection points between contour lines of the long object 3 shown in the image data and points where the contour lines of the long object 3 are curved are extracted as feature points, and at each feature point, a 128-dimensional feature value (vector) is extracted. Note, however, that the feature values are not limited to SIFT descriptors.

Figure 9:
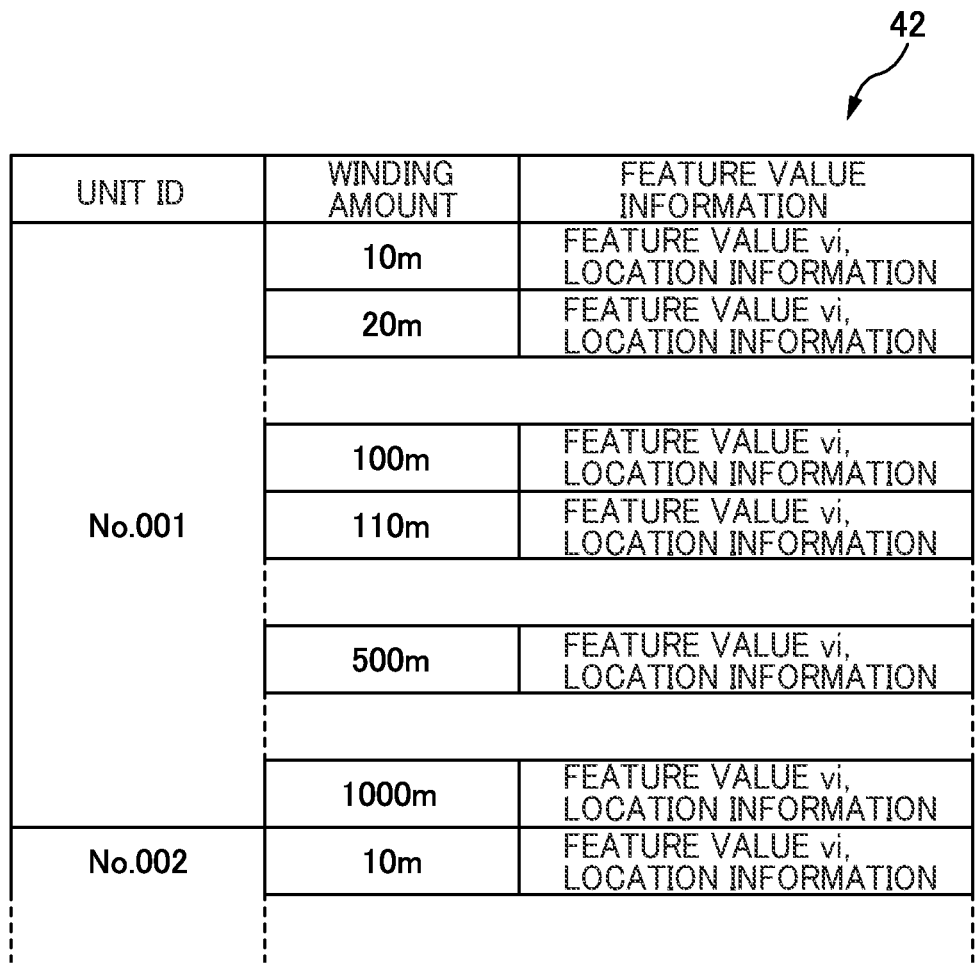
FIG. 9 is an explanatory diagram of an example of matching data according to one or more embodiments.

Next, the matching data generator 33 generates matching data 42 (S202). FIG. 9 is an explanatory diagram of an example of matching data 42. The matching data 42 in the figure is data in which the winding amount and the feature value information are associated with one another. The feature value information is data including feature values vi at n points (i=1 to n; vi is a 128-dimensional vector), and location information of each feature point. As described above, the feature values vi corresponding to a certain winding amount are acquired by the image processor 32 (the feature value extractor 32B) based on the image data (image capture result) corresponding to the winding amount in the registration data 41. In the matching data 42, the winding amount and the feature value information are associated unit by unit (i.e., per unit ID). Note, however, that the feature value information is not limited thereto, and for example, the location information does not have to be included.

As illustrated in FIG. 3, after the registration data 41 is transmitted from the unit manufacturing device 10 (S102), the unit 1 is shipped from the unit manufacturing factory (S103), and reaches the user (S701). At the time of shipping of the unit 1, the control device 15 of the unit manufacturing device 10 transmits, to the management device 20, shipping data (purchase data) in which the ID of the user who purchased the unit (customer ID) is associated with the unit ID of the shipped unit 1 (S104).

Figure 10:
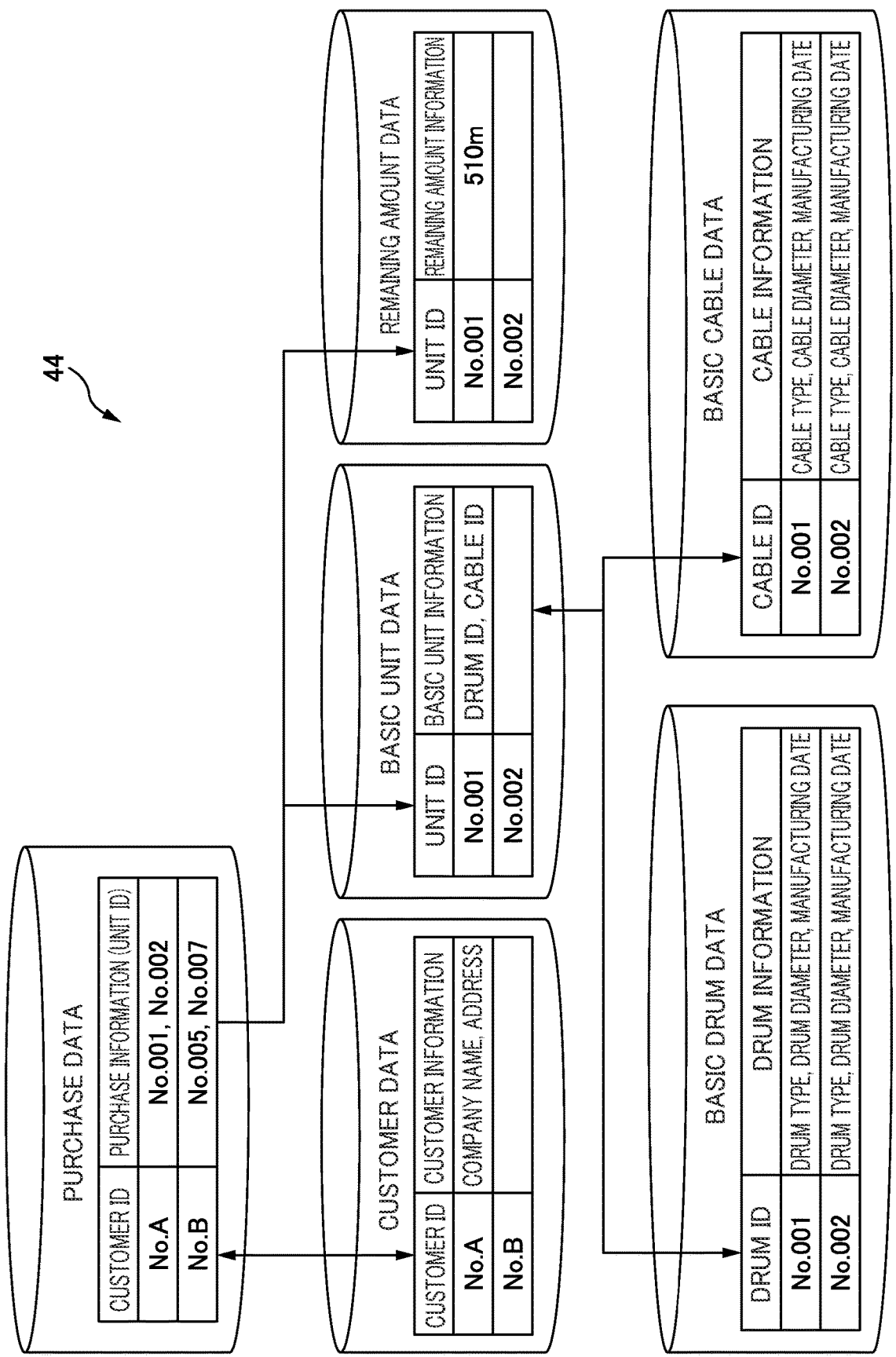
FIG. 10 is an explanatory diagram of an example of management data according to one or more embodiments.

FIG. 10 is an explanatory diagram of an example of management data 44. The management data 44 is data with which the management device 20 (more specifically, the management processor 35) manages information regarding customers and units 1. The management data 44 may include, for example, customer data, purchase data, basic unit data, etc.

The customer data is data for managing information regarding customers. The customer data is data in which the customer IDs are associated with customer information (such as company name, address, etc.).

The purchase data is data for managing units 1 purchased by customers. The purchase data is data in which the customer IDs are associated with unit IDs of units 1 purchased by the respective customers. When the shipping data is received (S203), the management processor 35 of the management device 20 updates the purchase data (S204) based on the shipping data (data in which the customer ID and the unit ID are associated). The customer ID in the purchase data is linked with the customer ID in the customer data. The unit ID in the purchase data is linked with the unit ID in the basic unit data (and remaining amount data).

The basic unit data is data for managing information (basic unit information) at the time of manufacturing the unit 1. The basic unit data is data in which unit IDs are associated with the basic unit information (see FIG. 5). As described above, the unit manufacturing device 10 transmits, to the management device 20, the basic unit data (see FIG. 5) generated at the time of manufacturing the unit 1, and the management device 20 (the management processor 35) updates the basic unit data based on the received data. The drum ID and cable ID included in the basic unit information are linked, respectively, to the drum ID in drum data for managing information regarding drums 5 and to the cable ID in the cable data for managing information regarding cables (an example of the long object 3).

In one or more embodiments, the management data 44 includes remaining amount data. The remaining amount data is data for managing the remaining amount of the long object 3 (the cable in this example) wound in the unit 1. The remaining amount data is data in which unit IDs are associated with remaining amount information. The unit IDs in the remaining amount data are associated with, for example, the unit IDs in the purchase data and the unit IDs in the basic unit data. The remaining amount data will be managed by the management device 20 through processes S205 to S208 (described below) of FIG. 3.

The user who purchased the unit 1 will draw out the long object 3 from the drum 5 and thereby consume the long object 3 (see S702 of FIG. 3). In one or more embodiments, to manage the remaining amount of the long object 3 of the unit 1, the user uses a user terminal 70 to capture an image of the long object 3 wound around the unit 1 (S703), and transmits the image capture result to the management device 20 (S704). In one or more embodiments, image data of a still image is transmitted, as the image capture result, from the user terminal 70 to the management device 20. Note, however, that the image capture result to be transmitted from the user terminal 70 is not limited to image data of a still image. For example, the user terminal 70 may transmit image data of a moving image as the image capture result, or may transmit feature value information acquired from the image data by performing the aforementioned image processing.

The management device 20 receives the image capture result (in this example, the image data of a still image) from the user terminal 70 (see S205 of FIG. 3). The management device 20 (the data acquirer 31) stores, in the data storage 40, the image capture result received from the user terminal 70 via the receiver 50A. Next, based on the image capture result received from the user terminal 70, the management device 20 performs match processing (S206). In one or more embodiments, the image processor 32 of the management device 20 first subjects the image data to image processing, and then a matcher of the management device 20 performs match processing.

First, the image processor 32 performs image processing (preprocessing, feature value extraction processing) on the image data received from the user terminal 70. Image processing to be performed on the image data received from the user terminal 70 is the same as the image processing performed on the image data included in the registration data 41, so explanation thereof is omitted. Through this image processing, feature values $vi'$ at a plurality of feature points ($vi'$ is a 128-dimensional vector) and location information regarding the feature points are found.

Next, the matching processor 34 matches the feature value information which is the image capture result from the user terminal 70 and the feature value information stored in the matching data 42 (S206). The management device 20 (the matching processor 34) includes an access controller 34A for accessing the matching data 42 (see FIG. 7). The access controller 34A is implemented by an input/output device for inputting/outputting data. It should be noted that, in cases where the matching data 42 is stored in a device separate from the management device 20, the input/output device constituting the access controller 34A will also include a communication device (see FIG. 7). In one or more embodiments, the matching processor 34 finds pairs of feature points, where in each pair, the difference between the feature value $vi$ corresponding to the respective winding amount in the matching data 42 and the feature value $vi'$ of the image capture result from the user terminal 70 becomes the smallest (i.e., the length of the difference between the two vectors becomes the shortest). Also, based on the location information of the feature points, the matching processor finds pairs of fitting feature points, where in each pair, the positional relationship with other feature points fits each other. Then, the matching processor 34 calculates a matching score S for each winding amount from equation $S=p/n$, where n is the number of feature points (the number of feature values $vi$) associated with each winding amount and p is the number of pairs with fitting locations. From the matching data 42, the matching processor 34 identifies the winding amount having the highest matching score S, and outputs that winding amount as the matching result. Also, when outputting the winding amount as the matching result, the matching processor 34 also outputs the unit ID corresponding to that winding amount as the matching result.

It should be noted that, in cases where it is possible to specify the customer ID of the user who transmitted the image capture result, the matching processor 34 may perform the match processing by limiting the target of matching to unit IDs corresponding to the customer ID based on the purchase data (see FIG. 10). For example, in cases where the image capture result received from the user terminal 70 is accompanied by the information "Customer ID: No. A", the matching processor 34 may perform the match processing based on the matching data 42 by limiting the target of matching to the unit IDs (in this example, No. 001 and No. 002) corresponding to "Customer ID: No. A" based on the purchase data (see FIG. 10). In this way, the time required for the match processing can be reduced.

Further, in cases where it is possible to specify the unit ID of the unit 1 captured by the user, the matching processor 34 may perform the match processing by limiting the target of matching to the specified unit ID. For example, in cases where the image capture result received from the user terminal 70 is accompanied by the information "Unit ID: No. 001", the matching processor 34 may perform the match processing based on the matching data 42 by limiting the target of matching to that unit ID. In this way, the time required for the match processing can be reduced. It should be noted that, in this case, the matching processor 34 does not have to output the unit ID as the matching result.

Figure 11A:
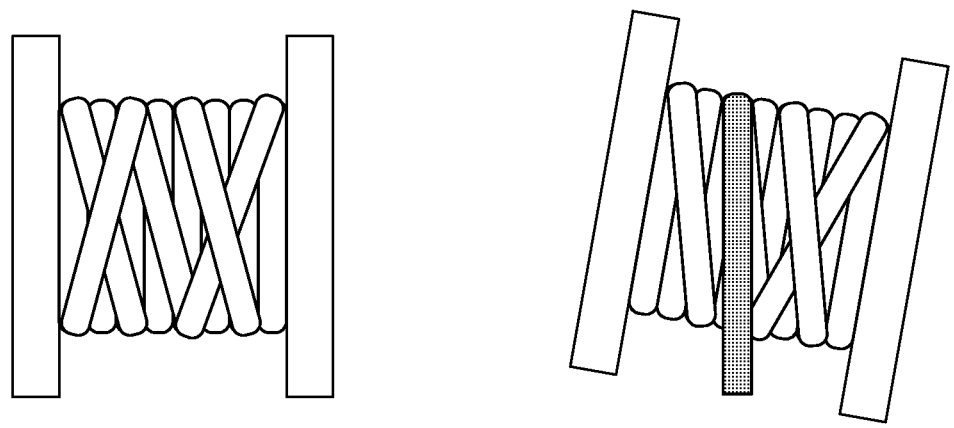
FIG. 11A is an explanatory diagram of image data used for acquiring feature value information.

FIG. 11A is an explanatory diagram of image data used for acquiring feature value information. The diagram on the left side illustrates image data captured at the time of manufacturing the unit 1, and the diagram on the right side illustrates image data captured with the user terminal 70. In this example, for the sake of explanation, the winding amount of the long object 3 is the same.

Even when the winding amount of the long object 3 is the same, an image of the unit 1 captured by the user terminal 70 is different from an image of the unit 1 captured at the time of manufacture. For example, as illustrated in the right-side diagram of FIG. 11A, an image of the unit 1 captured by the user terminal 70 may be tilted. Also, as illustrated in the right-side diagram of FIG. 11A, an end part (the hatched portion) of the long object 3 that has been cut by the user may be hanging down, and thus the captured image of the unit 1 may be different from that at the time of manufacture. Similarly, when an image of the unit 1 is captured with the user terminal 70, the position of the end part of the long object 3 wound around the drum 5 may be different from the position at the time of manufacture.

Figure 11B:
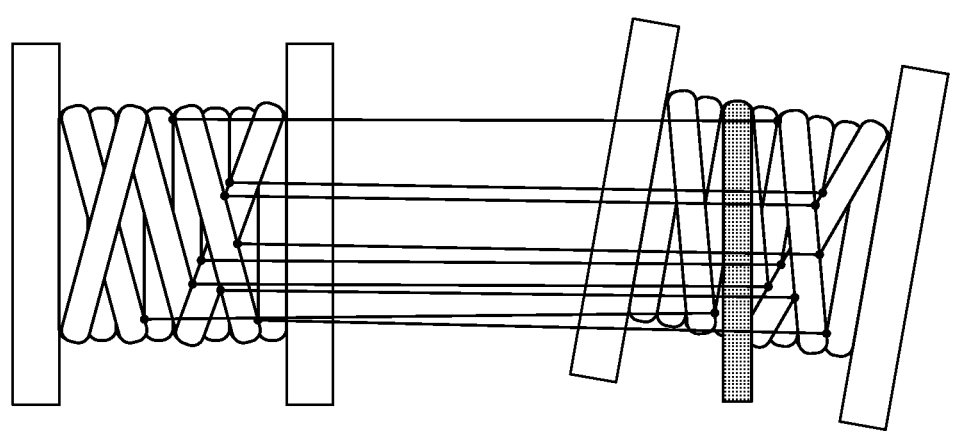
FIG. 11B is a conceptual diagram of match processing.

FIG. 11B is a conceptual diagram of match processing. Also in FIG. 11B, the diagram on the left side illustrates image data captured at the time of manufacturing the unit 1, and the diagram on the right side illustrates image data captured with the user terminal 70. Each pair of feature points at fitting locations is connected with a line.

Match processing employing feature values (particularly SIFT descriptors) has an advantage (robustness) in being invariant to image rotation and scale variation. Hence, even if an image of the unit 1 captured by the user terminal 70 is tilted as illustrated in the right-side diagram of FIG. 11A, match processing can be performed stably in one or more embodiments.

Further, even in cases where the position of the end part of the long object 3 wound around the drum 5 is different from the position at the time of manufacture, the positions of the long object 3 at the time of manufacture are retained at portions other than the end part (i.e., portions other than the hatched portion in FIG. 11A). Stated differently, even if the position of the end part of the long object 3 wound around the drum 5 is different from the position at the time of manufacture, the pattern of the unit 1 corresponding to the winding amount is retained at portions other than the end part (i.e., portions other than the hatched portion in FIG. 11A). Hence, as illustrated in FIG. 11B, pairs with fitting locations are formed at portions where the pattern is retained, thereby enabling match processing.

Next, based on the matching result, the matching processor 34 determines the remaining amount of the long object 3 (S207). The management device 20 (the matching processor 34) includes a determination controller 34B (see FIG. 7) for determining the remaining amount of the long object 3 based on the matching result. The determination controller 34B is implemented, for example, by the arithmetic processing device executing a program stored in the storage device (see FIG. 6). In this example, the matching processor 34 determines the winding amount with the highest matching score S as the remaining amount of the long object 3. Note, however, that the method for determining the remaining amount is not limited thereto. For example, the matching processor 34 may specify two winding amounts with high matching scores S, calculate a value between the two winding amounts by interpolation by implementing weighting in accordance with the matching scores S, and find the value calculated by interpolation as the remaining amount of the long object 3.

After determining the remaining amount (S207), the management processor 35 of the management device 20 updates the remaining amount information corresponding to the predetermined unit ID in the management data 44 (see FIG. 10) (S208). For example, the management processor 35 stores "Remaining amount: 510 m" in association with "Unit ID: No. 001" in the remaining amount data in the management data 44 (see FIG. 10).

The management device 20 of this first example determines the remaining amount of the long object 3 based on a matching result found by matching: matching data (see FIG. 9) in which winding amounts of the long object 3 and image capture results, which are obtained by successively capturing images of the unit 1 while winding the long object 3 around the drum 5 at the time of manufacturing the unit 1, are associated with one another; and an image capture result of the unit acquired from a user terminal 70. In this way, it is possible to facilitate the management of the remaining amount of the long object 3. The management device 20 of the first example acquires a plurality of pieces of data including the winding amount of the long object 3 obtained by successively capturing images of the unit 1 while winding the long object 3 around the drum 5 and the image capture result corresponding to the winding amount, and by using the plurality of pieces of data (registration data), generates matching data in which the image capture result of the unit 1 serves as input and the winding amount of the long object 3 serves as output. In this way, it is possible to generate matching data with which the remaining amount of the long object can be managed easily.

Incidentally, after storing the remaining amount of the long object 3 (S208) based on the matching result (S207), there may be cases where an image capture result of the unit 1 is acquired again from the user terminal 70. In such cases, if it is possible to specify the remaining amount of the unit ID to be the target of matching, then it is preferable that the matching processor 34 performs match processing by excluding winding amounts greater than that remaining amount from the target of matching. For example, when performing matching with the matching data 42 (see FIG. 9) in which the unit ID is No. 001, the matching processor 34 performs the match processing by excluding, from the target of matching, winding amounts greater than the remaining amount ("510 m" in this example) corresponding to "Unit ID: No. 001" stored in the remaining amount data. In this way, the time required for the match processing can be reduced.

The management processor 35 of the management device 20 may transmit remaining amount information to the user terminal 70 which transmitted the image capture result. In this case, the management device 20 (the management processor 35) transmits the remaining amount information to the user terminal 70 via the transmitter 50B (see FIG. 7). In this way, the user terminal 70 can grasp the remaining amount of the long object 3 simply by transmitting an image capture result of the unit 1, and thus, it is possible to reduce the burden of management on the user side.

Further, in cases where the management device 20 (more specifically, the management processor 35) outputs, in the aforementioned match processing (see S206 of FIG. 3), the winding amount together with the unit ID corresponding to that winding amount as the matching result, the unit ID and information associated with the unit ID (e.g., the manufacturing date of the unit 1, cable information, etc.) may also be transmitted to the user terminal 70. For example, the management device 20 may transmit basic unit cable (see FIGS. 5 and 10; e.g., cable ID, manufacturing date, etc.) corresponding to the unit ID and cable information (see FIG. 10; e.g., cable type, etc.) via the transmitter 50B to the user terminal 70 that transmitted the image capture result. In this way, the user terminal 70 can grasp information regarding the unit 1 simply by transmitting an image capture result of the unit 1, and thus, it is possible to reduce the burden of management on the user side.

Modified Example 1

Figure 12:
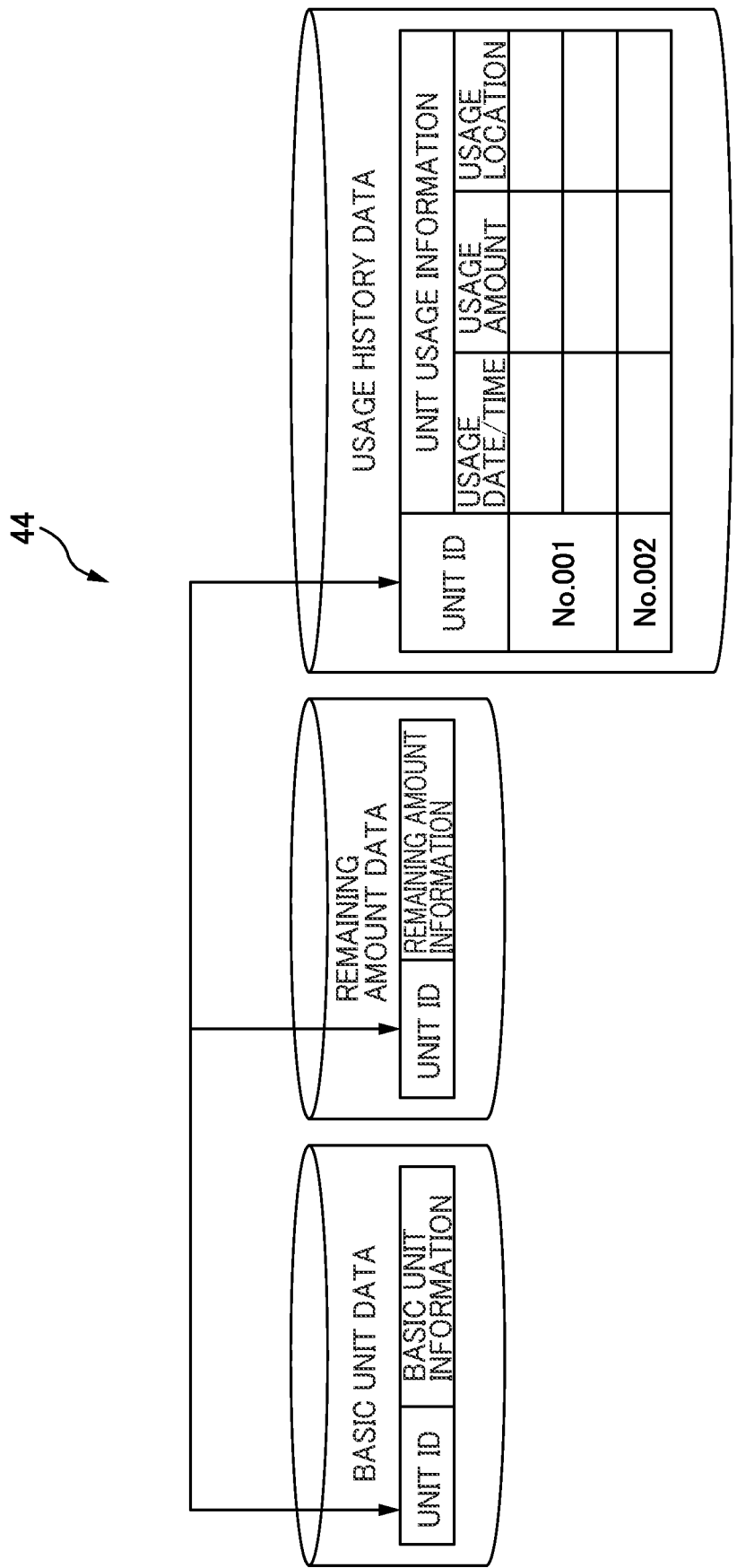
FIG. 12 is an explanatory diagram of management data according to a modified example.

FIG. 12 is an explanatory diagram of management data 44 according to a modified example.

The management data 44 of the modified example includes usage history data. The usage history data is data for managing the usage history of the unit 1. The usage history data is data in which the unit ID is associated with usage information of the unit 1. By accumulating the usage information of the unit 1, it is possible to manage the usage history of the unit 1. In this example, the unit usage information includes usage date/time, usage amount, and usage location.

In the modified example, the management processor 35 adds the unit usage information to the usage history data after the aforementioned match processing (S206) and the remaining amount determination processing (S207). For example, the management processor 35 registers the date/time that the image capture result was received from the user terminal 70 as the usage date/time of the unit 1. Also, the management processor 35 registers the difference in remaining amount information before and after performing updating in S208 as the usage amount of the unit 1. Further, in cases where the user terminal 70 sends GPS-based location information at the time of transmitting the image capture result, the management processor 35 can register the location information received from the user terminal 70 as the usage location of the unit 1.

Modified Example 2

Figure 13A:
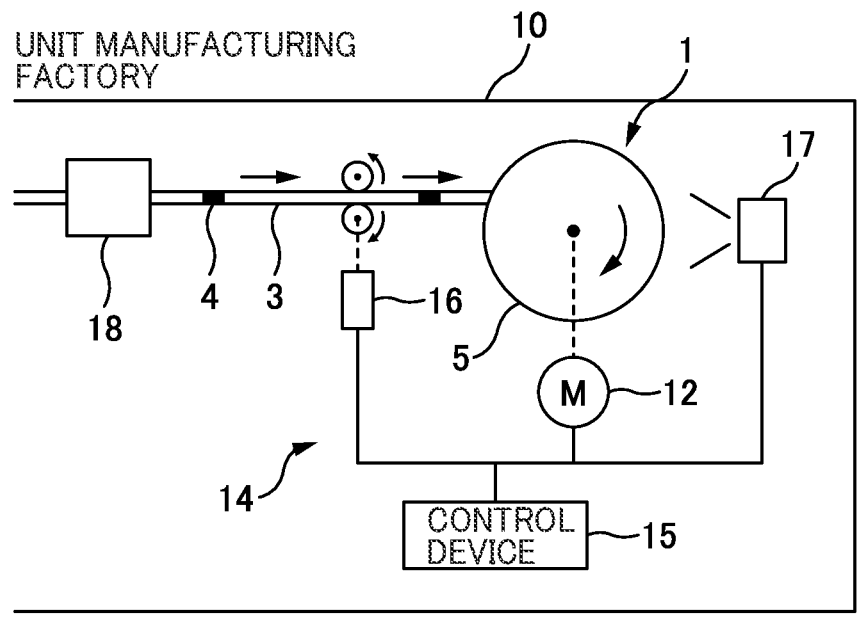
FIG. 13A is an explanatory diagram of a unit manufacturing device according to a modified example.
Figure 13B:
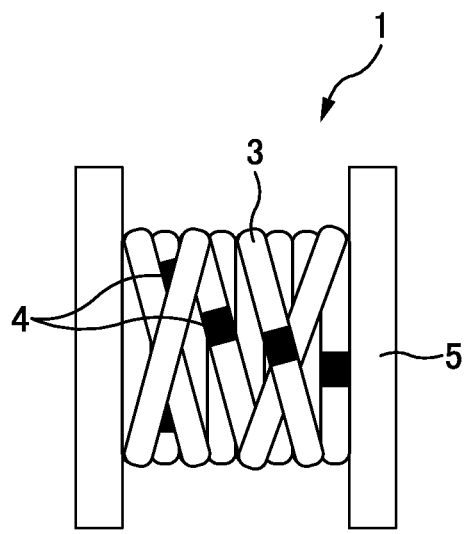
FIG. 13B is an explanatory diagram of a unit according to a modified example.

FIG. 13A is an explanatory diagram of a unit manufacturing device 10 according to a modified example. FIG. 13B is an explanatory diagram of a unit 1 according to a modified example.

The unit manufacturing device 10 of the modified example includes a mark forming device 18. The mark forming device 18 is a device for forming marks 4 on the long object 3. In this example, the mark forming device 18 is constituted by a printing device. Note, however, that the mark forming device 18 is not limited to a printing device.

Each mark 4 is an indication or pattern formed on the outer periphery of the long object 3. The marks 4 may be formed in a planar manner on the surface of the long object 3, or may be formed in a three-dimensional manner such as by projections and depressions. In the modified example, the winding amount (remaining amount) and the unit ID are specified not only by the pattern consisting of pits and bumps formed by the surface of the long object, but also by the pattern appearing on the unit's surface including the marks 4. In this example, each mark 4 is a ring-like mark printing over the entire periphery of the long object 3. The marks 4 are not limited to printed marks, but may be, for example, engraved marks or patterns consisting of projections and depressions. The marks 4 may be constituted by patterns, signs, letters, indicators, logos, etc., or may be a combination thereof (e.g., a combination of letters indicating the unit ID and a scale mark indicating a predetermined length). In this example, the marks 4 are formed with predetermined intervals therebetween along the length direction of the long object 3. Note, however, that the intervals between the marks do not have to be constant, but may be random. If will suffice if the length direction of the long object 3 does not become uniform by forming the marks 4 on the long object 3.

As illustrated in FIG. 13A, the unit manufacturing device of the modified example manufactures a unit 1 by winding, around a drum 5, a long object 3 provided with marks 4. The registration data generating device 14 of the modified example successively captures images of the long object 3 (the long object 3 with marks) being wound around the drum 5 at the time of manufacturing the unit 1, and generates data (registration data) in which the winding amount of the long object 3 at the time of image capturing is associated with the image capture result.

As illustrated in FIG. 13B, also in the modified example, the long object 3 wound around the drum 5 forms a pattern on the surface of the unit 1. In the modified example, since the marks 4 are formed on the long object 3, the pattern of the unit 1 becomes intricate. As a result, the pattern of each unit 1 can create large individual differences among units in accordance with the various winding amounts, thus facilitating distinction from other patterns. For example, by forming the marks 4 on the long object 3 to make the pattern on the unit 1 intricate, the number of feature points can be increased, thus enhancing the accuracy of the match processing (see S206 of FIG. 3).

In this example, each mark 4 is constituted by a ring-like mark and is formed over the entire periphery of the long object 3. Note, however, that the mark 4 may be formed partially in the circumferential direction of the long object 3. In cases where the marks 4 are formed partially in the circumferential direction of the long object 3, the pattern of the unit 1 can be made more intricate if the long object 3 is wound around the drum 5 while turning randomly (i.e., twisting randomly) in the circumferential direction. This makes it even more advantageous to distinguish between other patterns, thus further enhancing the accuracy of the match processing (see S206 of FIG. 3).

Second Example

In the foregoing embodiments, the match processing is performed by matching between: feature value information stored in the matching data 42 illustrated in FIG. 9 (an example of matching data 42); and the feature value information which is the image capture result from the user terminal 70. The match processing, however, is not limited thereto. For example, the match processing may be performed based on a matching model (another example of matching data 42) created by machine learning, as described below.

FIGS. 14A and 14B are explanatory diagrams of a second example. FIG. 14A is a conceptual diagram illustrating creation of a matching model. FIG. 14B is a conceptual diagram illustrating match processing employing the matching model. The process illustrated in FIG. 14A corresponds to the so-called learning phase in machine learning. The process illustrated in FIG. 14B corresponds to the so-called prediction phase based on a learned model.

As in the first example, also in this second example, the management device 20 receives registration data from the unit manufacturing device 10 (see S201 of FIG. 3). The registration data includes a plurality of pieces of data in which the winding amount of the long object 3 at the time of image capturing is associated with the image capture result corresponding to the winding amount, and this registration data serves as learning data (training data). It should be noted that the image capture result included in the registration data may be image data as in FIGS. 4A and 4B, or feature value information as in FIG. 9.

As illustrated in FIG. 14A, the matching data generator 33 of the second example creates, by machine learning, a learning model, wherein the registration data serves as training data, the image capture results included in the registration data (training data) serve as input data, and the winding amounts associated with the image capture results serve as output data. The matching data generator 33 performs machine learning based on the registration data (training data), to create a matching model as a learned model (see S202 of FIG. 3). The matching model serves as matching data in which various winding amounts of the long object 3 obtained by successively capturing images of the unit 1 while winding the long object 3 around the drum 5 at the time of manufacturing the unit 1 are associated respectively with the image capture results. Also, the matching model serves as matching data in which the image capture result of the unit 1 serves as input and the winding amount of the long object 3 serves as output.

As illustrated in FIG. 14B, at the time of match processing (see S206 of FIG. 3), the matching processor 34 inputs, to the matching model, the image capture result (image data or feature value information) acquired from the user terminal 70, and outputs, from the matching model, a prediction value of the winding amount as a matching result. In the second example, the prediction value of the winding amount outputted from the matching model is determined as the remaining amount of the unit 1 (S207).

Also in this second example, the management device 20 determines the remaining amount of the long object 3 (see FIG. 14B) based on a matching result found by matching: matching data (the matching model of FIG. 14A) in which winding amounts of the long object 3 and image capture results, which are obtained by successively capturing images of the unit 1 while winding the long object 3 around the drum 5 at the time of manufacturing the unit 1, are associated with one another; and an image capture result of the unit acquired from a user terminal 70. In this way, also in this second example, it is possible to facilitate the management of the remaining amount of the long object 3. Also in this second example, the management device 20 acquires a plurality of pieces of data including the winding amount of the long object 3 obtained by successively capturing images of the unit 1 while winding the long object 3 around the drum 5 and the image capture result corresponding to the winding amount, and by using the plurality of pieces of data (registration data), creates a matching model (matching data) in which the image capture result of the unit 1 serves as input and the winding amount of the long object 3 serves as output. In this way, it is possible to generate matching data with which the remaining amount of the long object can be managed easily.

It should be noted that the match processing is not limited to the first and second examples. Other match processing may be performed, so long as it is possible to specify an image capture result that is close to the image capture result of the user terminal 70, from among the image capture results obtained at the time of manufacture by matching the image capture results successively captured at the time of manufacturing the unit 1 and the image capture result acquired from the user terminal 70.

Third Example

In the foregoing first and second examples, the management device 20 generates the matching data (see S202 of FIG. 3), receives the image capture data (S205), and performs the match processing (S206), but instead, a device (e.g., a matching data generating device) separate from the management device 20 may generate the matching data (S202), and the management device 20 may receive the image capture data (S205) and perform the match processing (S206). Further, in the foregoing first and second examples, the management device 20 includes a data storage for storing the matching data (see FIG. 7), but instead, the matching data may be stored in a data storage of a device separate from the management device 20.

In cases where a device (e.g., a matching data generating device) separate from the management device 20 generates the matching data (see S202 of FIG. 3), in the aforementioned process of S101, the registration data generating device 14 of the unit manufacturing device 10 transmits the registration data 41 to the matching data generating device. The matching data generating device receives the registration data 41 from the unit manufacturing device 10, and stores the registration data 41 in its data storage (i.e., a device separate from the management device 20 performs the aforementioned process of S201). Further, the matching data generating device generates the matching data 42 based on the registration data 41 (i.e., a device separate from the management device 20 performs the process of S202). The generated matching data 42 may be stored in the data storage 40 of the management device 20, or may be stored in the data storage of the matching data generating device, or may be stored in a device separate from the management device and the matching data generating device. In the description below, the device for storing the matching data 42 may be referred to as "matching data management device".

In cases where the matching data 42 is stored in a data storage of a device separate from the management device 20, the management device 20, in the aforementioned process of S206, accesses the device (the matching data management device) that stores the matching data, and thereby performs the match processing based on the image capture result received from the user terminal 70. Then, after the match processing of S206, the management device 20 determines the remaining amount of the long object 3 based on the matching result, as in the foregoing first and second examples.

As in the foregoing first and second examples, also in this third example, the management device receives, from a user terminal, an image capture result obtained by capturing an image of a unit (S205), and determines the remaining amount of the long object based on a matching result found by matching the image capture result acquired from the user terminal and matching data (data in which the image capture results obtained when successively capturing images of the unit while winding the long object around the drum are associated with the respective winding amounts of the long object wound around the drum at the time of image capturing; e.g., the matching data 42 of FIG. 9) (S206, S207). Stated differently, as in the foregoing first and second examples, also in this third example, the management device includes: a receiver 50A (see FIG. 7) configured to receive an image capture result from a user terminal; an access controller 34A (see FIG. 7) configured to access matching data; and a determination controller 34B configured to determine the remaining amount of the long object based on the result of matching the matching data and the image capture result acquired from the user terminal. In this way, also the management device of the third example can facilitate management of the remaining amount of the long object.

Others:

The foregoing embodiments are for facilitating the understanding of the present invention, and are not to be construed as limiting the present invention. The present invention may be modified and/or improved without departing from the gist thereof, and it goes without saying that the present invention encompasses equivalents thereof.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Unit;
3: Long object;
4: Mark;
5: Drum;
10: Unit manufacturing device;
12: Winding device;
14: Registration data generating device;
15: Control device;
16: Length measuring device;
17: Image capturing device;
18: Mark forming device;
20: Management device;
30: Controller;
31: Data acquirer;
32: Image processor;
32A: Preprocessor;
32B: Feature value extractor;
33: Matching data generator;
34: Matching processor;
34A: Access controller;
34B: Determination controller;
35: Management processor;
40: Data storage;
41: Registration data;
42: Matching data;
44: Management data;
50: Communicator;
50A: Receiver;
50B: Transmitter;
70: User terminal;
90: Communication network;
100: Management system.

The invention claimed is:

1. A management method for managing a unit including a drum and a long object wound around the drum, the management method comprising:
   manufacturing the unit by winding the long object around the drum while rotating the drum;
   successively measuring, with a length measuring device, winding amounts of the long object wound around the drum while rotating the drum;
   successively capturing, with a camera, images of the unit while rotating the drum;
   while rotating the drum, successively acquiring, with a controller, the measured winding amounts and the captured images;
   generating, with the controller, a plurality of pieces of registration data each of which associates one of the captured images with a corresponding one of the measured winding amounts;
   generating, with a management device, correspondence data based on the generated plurality of pieces of registration data;
   acquiring, with the management device, an image of the unit captured by a user terminal; and
   determining, with the management device, a remaining amount of the long object in the unit by matching the image captured by the user terminal with the captured images in the correspondence data.

2. The management method according to claim 1, wherein in the correspondence data, a unit ID for identification of the unit is associated with the winding amounts and the captured images, and
   the management device determines the unit ID based on the captured images and the correspondence data.

3. The management method according to claim 2, wherein the unit ID is associated with information on the unit, and the method further comprises transmitting the information on the unit with the determined unit ID to the user terminal.

4. The management method according to claim 1, wherein the long object has a mark.

5. The management method according to claim 1, wherein, in the correspondence data, the winding amounts are associated with a feature value extracted from image data obtained by capturing an image of the unit.

6. The management method according to claim 5, wherein the management device stores the determined remaining amount in a storage.

7. The management method according to claim 6, wherein the management device receives an additional captured image from the user terminal after receiving the captured images, and
   the management device determines an additional remaining amount of the long object based on the additional captured image and the correspondence data from which one or more of the winding amounts greater than the determined remaining amount have been excluded.

8. The management method according to claim 1, wherein the correspondence data is a learned model generated by machine learning, wherein the captured images serve as input data and the winding amounts serve as output data.

9. A method for generating correspondence data for determining a remaining amount of a long object wound around a drum, the method comprising:
   manufacturing a unit by winding the long object around the drum while rotating the drum;
   successively measuring, with a length measuring device, winding amounts of the long object wound around the drum while rotating the drum;
   successively capturing, with a camera, images of the unit while rotating the drum;
   while rotating the drum, successively acquiring, with a controller, the measured winding amounts and the captured images;
   generating, with the controller, a plurality of pieces of registration data each of which associates one of the captured images with a corresponding one of the measured winding amounts; and
   generating, with a management device, the correspondence data based on the generated plurality of pieces of registration data.

10. A management system that manages a unit including a drum and a long object wound around the drum, the management system comprising:
   a unit manufacturing device that manufactures the unit by winding the long object around the drum while rotating the drum;
   a length measuring device that successively measures winding amounts of the long object wound around the drum while rotating the drum;
   a camera that successively captures images of the unit while rotating the drum;
   a controller that:
      while rotating the drum, successively acquires the measured winding amounts and the captured images,
      generates a plurality of pieces of registration data each of which associates one of the captured images with a corresponding one of the measured winding amounts; and
   a management device that:
      generates correspondence data based on the generated plurality of pieces of registration data,
      acquires an image of the unit captured by a user terminal, and
      determines a remaining amount of the long object in the unit by matching the image captured by the user terminal with the captured images in the correspondence data.

* * * * *